United States Patent [19]
Gyllner

[11] Patent Number: 5,964,310
[45] Date of Patent: Oct. 12, 1999

[54] OPERATOR'S STATION SUPPORTING STRUCTURE

[75] Inventor: Sven B. Gyllner, Soderhamn, Sweden

[73] Assignee: Caterpillar Inc., Peoria, Ill.

[21] Appl. No.: 08/989,885

[22] Filed: Dec. 12, 1997

[51] Int. Cl.$^6$ .................................................. B62D 33/06
[52] U.S. Cl. ..................................... 180/89.13; 180/89.14
[58] Field of Search ........................... 180/89.12–89.19; 280/124.177

[56] References Cited

U.S. PATENT DOCUMENTS

| | | | |
|---|---|---|---|
| 4,294,324 | 10/1981 | Kimball | 180/89.14 |
| 4,735,272 | 4/1988 | Sjostrom | 180/89.14 |
| 4,807,713 | 2/1989 | Smith et al. | 180/89.14 |
| 5,209,316 | 5/1993 | Bauer | 180/89.14 |

*Primary Examiner*—Christopher P. Ellis
*Assistant Examiner*—Kevin M. McKinley
*Attorney, Agent, or Firm*—Alan J. Hickman

[57] ABSTRACT

A supporting structure pivotally connects a first end portion of an operator's station to a first end portion of a supporting frame. A dampening device is connected to a second end portion of the operator's station and controls elevational movement of the second end portion of the operator's station in response to pivotal movement of the first end portion. A stop is connected between the second end portion of the operator's station and the supporting frame. The stop maintains the second end portion from excessive elevational movement during the application of excessive forces to the operator's station and prevents damage to the dampening device caused by excessive elevational movement.

19 Claims, 3 Drawing Sheets

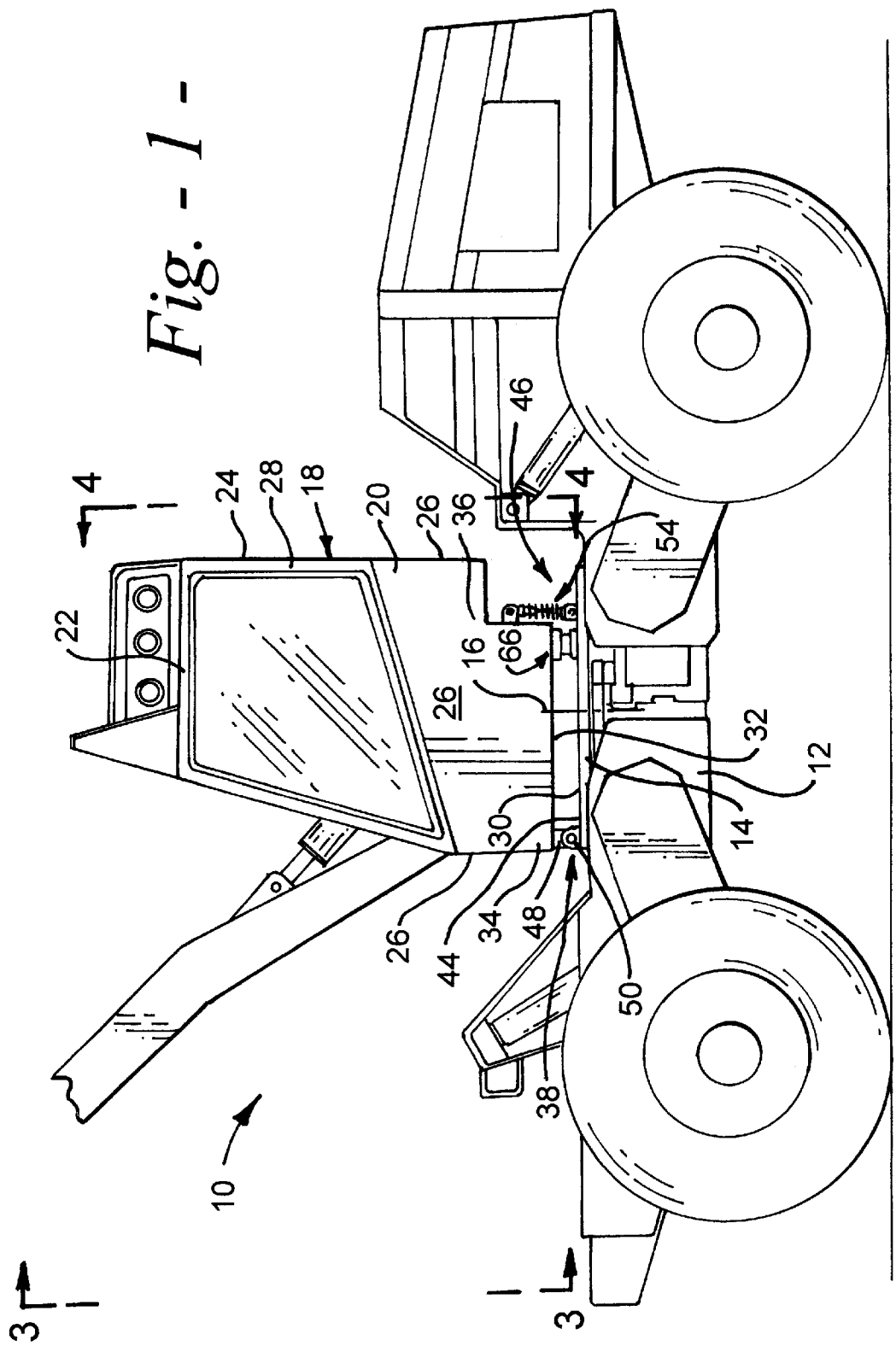
Fig. - 1 -

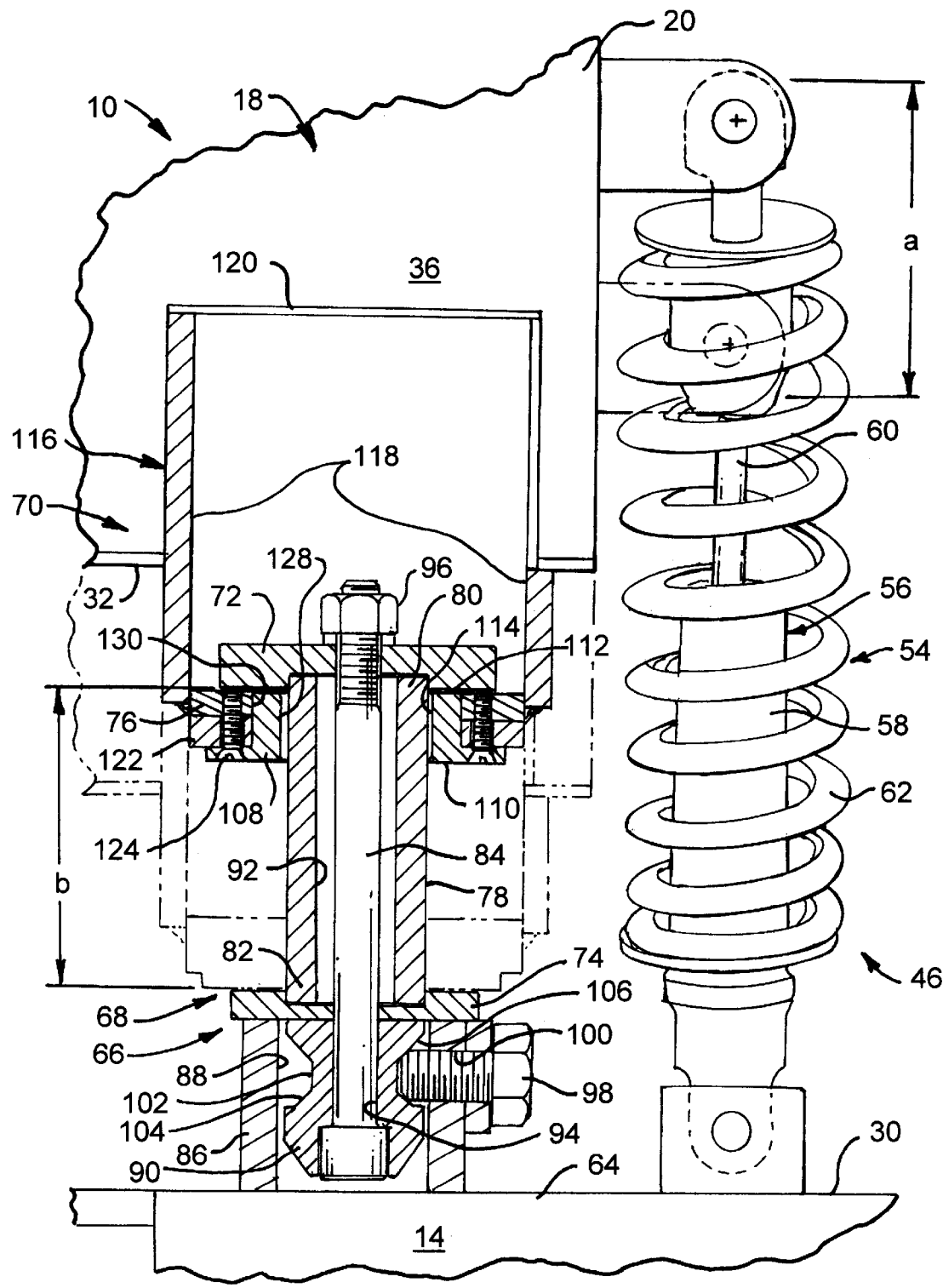
Fig. - 2 -

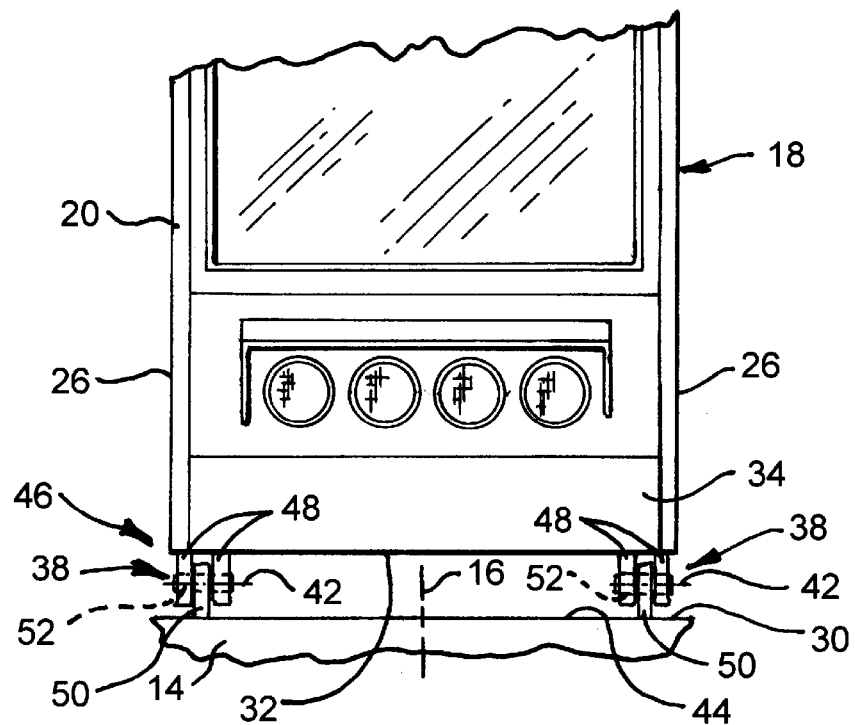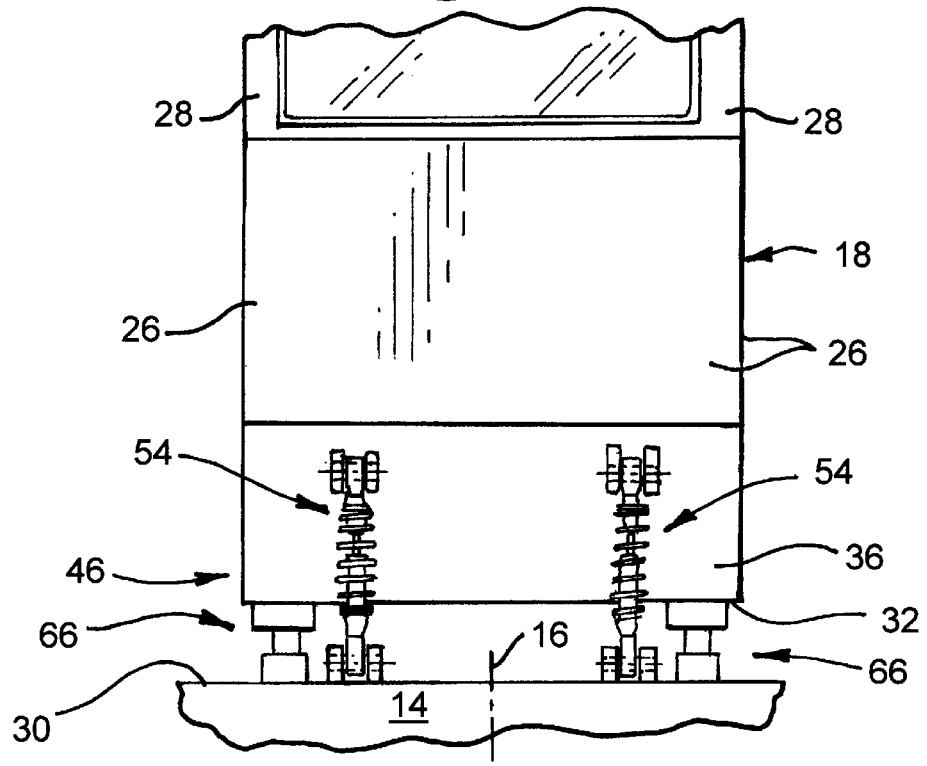

OPERATOR'S STATION SUPPORTING STRUCTURE

TECHNICAL FIELD

This invention relates to a supporting structure for an operators station and more particularly to a supporting structure for maintaining a suspended operator's station from excessive pivotal movement.

BACKGROUND ART

Operator's stations have been connected to the frame of a mobile work machine in an assortment of ways. In some applications, the operator's station is rigidly connected to the frame. In other applications the operator's station is suspended and movably connected to the frame by resilient mountings. A resiliently suspended operator's station provides additional ride comfort for the operator. However, such suspension systems do not provide the support needed in some mobile work machine applications and are not suitable for use.

An operator's station of the type used in mobile work machine operations typically has an enclosing structure including overhead and supporting structures. The enclosing structure is provided to protect the operator from the elements when enclosed with walls to form a cabin. The enclosing structure is also designed to withstand the forces of falling objects and a machine rollover, whether enclosed or not. The enclosing structure is typically connected to the machine frame in a manner sufficient to withstand these forces. Because of this strength requirement operator's stations used in this environment are normally not suspended.

In some mobile work machine applications, for example, excavators, and tree harvesters, the operator's station is mounted on a supporting frame which is pivotally connected to a machine frame for pivotal movement about a vertical axis. Pivotal movement of the supporting frame enables the operator to continuously face a work implement mounted on the supporting frame and the work being performed. In such applications, it has been known to resiliently mount the operator's station on the supporting frame. However, such resilient mountings have not been satisfactory to resist the applied forces and provide adequate longevity.

Resiliently mounting an operator's station on a supporting frame and independently rigidly mounting an overhead structure on the supporting frame which surrounds the operator's station is not suitable as it requires additional space, reduces visibility and increases material usage and costs.

Resiliently mounted operator's stations of certain designs also tend to be unstable during machine operations. This instability is typically prevalent in suspended operator's stations having suspension mountings at four corners of the operator's station. Such mountings are also prone to premature wear and failure.

It is therefore desirable to provide a supporting structure that is capable of withstanding the forces encountered during machine operation and provide suitable operator's station suspension and dampening.

The present invention is directed to overcoming one or more of the problems as set forth above.

DISCLOSURE OF THE INVENTION

A supporting structure for maintaining an operator's station of a work machine from excessive pivotal movement relative to a supporting frame of the work machine in response to a force being applied to and pivotally moving the operator's station is provided. A pivot joint having a transverse axis pivotally connects the first end portion of the operator's station to the supporting frame. The operator's station is pivotally movable about the transverse axis in elevational directions relative to the supporting frame. A dampening device having first and second spaced apart extreme limits of movement is connected to and between the second end portion of the operator's station and the supporting frame. The dampening device maintains the operators station from uncontrolled pivotal oscillations. A stop having a first portion is connected to a one of the supporting frame and the operator's station. The stop has a second portion connected to an other of the operator's station and supporting frame. The stop has a first flange, a second flange and a third flange. The first and second flanges are spaced apart and connected to the first portion. The third flange is connected to the second portion. The third flange is engageable with one of the first and second flanges in response to a preselected amount of pivotal movement of the operator's station about the transverse axis and maintains the dampening device from moving to a one of the first and second extreme limits of movement.

A supporting structure for maintaining an operator's station of a work machine from excessive pivotal movement relative to a supporting frame of the work machine in response to a force being applied to and pivotally moving the operator's station is provided. A pair of spaced pivot joints has a common transverse axis. The pivot joints pivotally connect a first end portion of the operator's station to the supporting frame. The operator's station is pivotally movable about the transverse axis in elevational directions relative to the supporting frame. A pair of spaced apart dampening devices, each having first and second spaced apart extreme limits of movement, is connected to and between a second end portion of the operator's station and the supporting frame. The dampening devices maintain the operators station from uncontrolled pivotal oscillations. A pair of spaced apart stops each have a first portion connected to a one of the supporting frame and a second portion connected to an other of the operator's station. The stops have a first flange, a second flange and a third flange. The first and second flanges are spaced apart a preselected distance "b" and are connected to the first portion. The third flange is disposed between the first and second flanges and connected to the second portion. The third flange is engageable with one of the first and second flanges in response to pivotal movement of the operator's station about said pivot axis and maintains the operator's station from moving the pair of dampening devices to a one of the first and second extreme limits of movement. The first and second extreme limits of movement of the pair of dampening devices are spaced a preselected distance "a" apart. The distance "a" is greater in magnitude than the preselected distance "b" between the first and second flanges.

BRIEF DESCRIPTION OF THE DRAWINGS

FIG. 1 is a diagrammatic side view of an embodiment of the present invention showing a mobile work machine having a supporting structure for an operator's station;

FIG. 2 is a diagrammatic partial enlarged view of a portion of FIG. 1, showing a portion of the supporting structure in greater detail and the operator's station at a fully raised position in solid lines and at a fully lowered position in phantom lines;

FIG. 3 is a diagrammatic view taken along lines 3—3 of FIG. 1; and

FIG. 4 is a diagrammatic view taken along lines 4—4 of FIG. 1.

BEST MODE FOR CARRYING OUT THE INVENTION

With reference to the drawings and particularly FIGS. 1, 3 and 4 a mobile work machine 10 having a machine frame 12 and a supporting frame 14 is provided. The supporting frame 14 is pivotally connected to the machine frame 12 and pivotal about a elevationally oriented axis 16 (shown as being substantially vertical). This pivotal connection is made in any conventional manner known by those skilled in the art. The mobile work machine 10 includes, for example, excavators, tree harvesters and other mobile work machines with pivotal supporting frames 14.

An operator's station 18 has an enclosing structure 20. The enclosing structure 20 has an overhead portion 22 and a side structure 24 supporting the overhead portion 22. The supporting structure 24 may include side walls 26 and/or elevationally oriented posts 28 as is common in the industry. The enclosing structure 20 is constructed in a manner suitable to resist the forces of impact from, for example, from falling objects, machine side overturns, machine rollovers and the like. Such enclosing structures 20 are well known in the art and will not be discussed in any greater detail.

A supporting structure 46 is provided for maintaining the operator's station 18 from excessive pivotal movement relative to the supporting frame 14 in response to a force being applied to and elevationally moving the operator's station 18. The supporting frame 14 has a deck 30 upon which the operator's station 18 is connected. The operator's station has a floor 32 and first and second end portions 34,36. A pair of identical pivot joints 38, each having a transverse axis 42, pivotally connects the first end portion 34 of the operator's station to a first end portion 44 of the deck 30 of the supporting frame 14. The transverse axis 42 is oriented transversely to the elevational axis 16 and preferably substantially in a plane normal to the axis. The operators station 18 is elevationally pivotally movable about the transverse axis 42 and relative to the deck 30 of the supporting frame 14.

The pivot joints 38 each have a first bracket 48 connected to the first end portion 34 of the operator's station 18 and a second bracket 50 connected to the first end portion 44 of the deck 30. A pivot pin 52 pivotally connects the first and second brackets 48,50 to each other and maintains the operator's station 18 for pivotal movement about the transverse axis 42.

Referring to FIG. 2 showing elevational movement of the second end portion 36 of the operator's station between a fully raised position, in solid lines, a fully lowered position, in phantom lines, and FIG. 4, showing a rear view of the operator's station 18. The supporting structure 46 includes a pair of spaced apart dampening devices 54 of identical construction. Only one dampening device 54 is shown in FIGS. 1 and 2. The dampening devices 54 each have first and second preselected spaced apart limits of movement defining a preselected distance "a". Each dampening device 54 is connected to and between the operators station 18 and the supporting frame 14. In particular, the dampening devices 54 each include a conventional linear shock absorber 56 having a cylinder 58, a piston and rod assembly 60 slidably disposed in the cylinder 58 and extensibly movable relative to the cylinder 58. A fluid in the cylinder 58 dampens extensible movement of the piston and rod assembly 60 and the operator's station connected thereto. The piston and rod assemblies 60 are shown as being connected to the second end portion 36 of the operator's station and the cylinders 58 are connected to a second end portion of the supporting frame 64. The second end portion 64 of the supporting frame 14 is spaced from the first end portion 44. A coil spring 62 is disposed about each shock absorber 56 and connected at opposite end portions of the coil spring 62 to the piston rod assembly 60 and the cylinder 58, respectively. The coil springs 62 provides a force necessary to suspend the second end portion of the operator's station 18 and provide optimum suspension characteristics for the machine operator.

The supporting structure 46 includes a pair of spaced apart stops 66 having a first portion 68 connected to the supporting frame 14 and a second portion 70 connected to the operator's station 18. It is to be noted that the connections may be reversed, the first portion 68 may be connected to the operator's station 18 and the second portion 70 may be connected to the supporting frame 14 without departing from the spirit of the invention. The stops 66 have a first flange 72, a second flange 74 and a third flange 76. The first and second flanges 72,74 are spaced apart and connected to the first portion 68 and the third flange 76 is connected to the second portion 70. The third flange 76 is engageable with the first flange 72 in response to a preselected amount of pivotal movement of the operator's station 18 about the transverse axis 42 in a direction toward the first flange 72. The third flange 76 is engaeable with the second flange 74 in response to a preselected amount of pivotal movement of the operator's station 18 about the transverse axis 42 in a direction toward the second flange 74. The operator's station 18 is maintained from further pivotal movement in the direction of movement subsequent to engagement with the engaged one of the first and second flanges 72,74. This limits the amount of pivotal movement and maintains the dampening devices 54 from moving to a related one of the first and second extreme limits of movement.

The first and second flanges 72,74 are spaced a preselected distance "b" apart. The preselected distance "a" is greater in magnitude than the distance "b". This dimensional relationship insures that the third flange 76 contacts one of the first and second flanges 72,74 before the dampening devices 54 are fully extended or retracted (at their first and second extreme limits of movement). It has been determined that the minimum difference in magnitude between "a" and "b" is 4 millimeters.

The first portion 68 preferably includes a cylindrical shaft 78 having first and second spaced apart end portions 80 and 82. The first and second flanges 72,74 are connected to the first and second end portions 80,82, respectively. The third flange 76 is disposed between the first and second flanges 72,74 and about the shaft 78. A threaded fastener 84 connects the first flange 72 to the shaft 78. The second flange 74 is connected to the shaft 78 by welding.

The first portion 68 of the stop 66 includes a base member 86 having an opening 88 therein. The base 86 member may be tubular, a box or any other suitable configuration. The base member 86 is connected to the supporting frame 14 and particularly to the deck 30 in any suitable manner, such as by welding. The second flange 74 is engaged with the base member 86.

A projecting portion 90 is connected to and extends from the second flange 74. The threaded fastener 84 extends axially through a clearance bore 92 in the shaft 78, a pilot bore 94 in the projecting portion 90, and secures the both the first flange 72 and the projecting portion 90 to the shaft 78 by way of the nut 96. The and second flanges 72,74 are piloted on the shaft 78 and the projecting portion 90 abuts the second flange 74. The shaft 78 and projecting portion 90 are axially aligned.

The projecting portion 90 is disposed in the opening 88 and connected to the base member 86 by way of a retaining fastener 98. The retaining fastener 98 is screw threadably disposed in a threaded bore 100 in the base member 86 and engaged with the projecting portion 90. The projecting portion 90 is cylindrical and has a groove 102. The groove 102 is annular and disposed circumferentially about the cylindrical projecting portion 90. The retaining fastener 98 is disposed in the groove 102 and retains the shaft 78 from axial movement. The groove 102 has a first tapered side 104, a second tapered side 106 spaced axially from the first tapered side 104. The retaining fastener 98 is engaged with the first and second sides 104,106 and positions the shaft 78 axially relative to the deck 30. The sides 104,106 are angled relative to each other to facilitate installation an axial positioning.

The third flange 76 of the second portion 70 includes a thrust member 108 having first and second opposed sides 110,112 and a bore 114 disposed in the thrust member and opening at the first and second sides 110,112. The shaft 78 is disposed in the bore 114 and longitudinally movable in the bore 114. The thrust member 108 is made of a non-metallic material of any suitable type and connected to the third flange 76. The thrust member is engageable with one of the first and second flanges 72,74 in response to a predetermined amount of pivotal movement of the operator's station 18 and elevational movement of the second portion 70 relative to the deck 30. The third flange 76 is indirectly engageable with the second flange 74 in response excessive movement in a direction toward the deck 30 and directly engageable with the first flange 72 in response to excessive movement away from the deck 30. In particular, the first side 110 of the thrust member 108 is directly engageable with the second flange 74 in response to excessive movement in a direction toward the deck 30 and the third flange 76 is directly engageable with the first flange in response excessive elevational movement in a direction away from the deck 30. It is to be noted that, in the context of this invention, excessive movement is less than full extension and retraction of the dampening device 54.

The shaft 78 is smaller in diameter than the bore 114 in the thrust member and defines a predetermined clearance therebetween. The clearance is suitable in magnitude to allow for free elevational movement of the operator's station 18 but small enough in magnitude to maintain the operator's station from excessive transverse movement relative to longitudinal extension of the shaft 78.

The second portion 70 has a supporting housing 116 connected to the operator's station 18. The supporting housing 116 is rectangular in configuration and has spaced apart sides 118 and a top 120. The third flange 76 is disposed between and connected to the spaced sides 118 by, for example, welding or another suitable fastening method.

A spacer 122 is disposed between the third flange 76 and the thrust member 108. The spacer 122 is suitable for determining the position of the thrust member 108 axially along the shaft 78 and provides adjustment thereof. Therefore, spacers of various thicknesses may be utilized to adjust the position of the thrust member relative to the second flange 74. The spacer 122 and thrust member 108 is connected to the third flange by a plurality of threaded fasteners 124. The third flange 76 and spacer 122 each have a bore 128 disposed therein for receiving a pilot portion 130 of the thrust member 108.

INDUSTRIAL APPLICABILITY

With reference to the drawings, and in operation, the operator's station 18, under the influence of machine dynamics, pivots in an elevational direction about the transverse axis 42. The dampening devices 58 cushion elevational movement of the second end portion 36 and prevents unwanted oscillations of the operator's station 18. This pivotal suspension provides operator comfort and smooth ride characteristics.

Because of the construction of the stop 66, the operator's station is free to pivotally move under the control of the dampening devices 54. Should forces causing pivotal movement of the operator's station become sufficient enough in magnitude to move the piston and rod assemblies 60 to either the fully extended or retracted positions, the stop 66 will prevent achievement of such full movement and prevent damage to the dampening devices 54.

In extreme situations, such as encountered when the overhead structure 22 of the operator's station 18 is impacted by a falling object or the enclosing structure 20 is significantly impacted from the side, the stops 66 will resist such forces and reduce the potential for damage to the environment of the operator's station 18.

Should an excessive elevationally oriented force be applied to the operator's station, one of the first or second flanges 72,74 will engage the third flange 76 and prevent further movement of the second end portion 36 of the operator's station 18. The one of the first and second flanges 72,74 to be engaged is a function of the direction of the elevationally oriented force. Should a transverse force be applied to the enclosing structure 20 of the operator's station 18, the thrust member 108 will engage the shaft 78 and restrain the operator's station 18 from excessive movement.

By providing the stop 66, it is possible to suspend the operator's station 18 and at the same time satisfactorily resist excessive forces applied to the operator's station.

Other aspects, objects and advantages of the present invention may be obtained from a further reading of the specification, the drawings and the appended claims.

I claim:

1. A supporting structure for maintaining an operator's station of a work machine from excessive pivotal movement relative to a supporting frame of the work machine in response to a force being applied to and pivotally moving the operator's station, said operator's station having first and second spaced apart end portions; comprising:

a pivot joint having a transverse axis and pivotally connecting the first end portion of the operator's station to the supporting frame, said operators station being pivotally movable about the transverse axis in elevational directions relative to the supporting frame;

a dampening device having first and second spaced apart extreme limits of movement and being connected to and between the second end portion of the operator's station and the supporting frame, said dampening device maintaining the operators station from uncontrolled pivotal oscillations, a stop having a first portion connected to a one of the supporting frame and the operator's station and a second portion connected to an other of the operator's station and supporting frame, said stop having a first flange, a second flange and a third flange, said first and second flanges being spaced apart and connected to the first portion, said third flange being connected to the second portion, said third flange being engageable with one of the first and second flanges in response to a preselected amount of pivotal movement of the operator's station about said transverse axis and maintaining the dampening device from moving to a one of the first and second extreme limits of movements said first portion including a base member connected to said supporting frame, an opening disposed in said base member, a projecting portion connected to and extending from the second flange, said projecting portion being disposed in the opening and connected to said base members.

2. A supporting structure, as set forth in claim 1, wherein said first and second flanges are spaced a preselected distance "b" apart and wherein said first and second spaced extreme limits of movement of the dampening device define a preselected distance "a" therebetween, said distance "a" being greater in magnitude than distance "b".

3. A supporting structure, as set forth in claim 2, wherein the difference between distance "a" and distance "b" is at least 4 millimeters.

4. A supporting structure, as set forth in claim 2, wherein said third flange being disposed between the first and second flanges.

5. A supporting structure, as set forth in claim 4, wherein the first portion includes a shaft having first and second spaced end portions, said first and second flanges being connected to the first and second end portions of said shaft, respectively.

6. A supporting structure, as set forth in claim 5, including a threaded fastener connecting the first flange to the shaft.

7. A supporting structure, as set forth in claim 6, wherein the second flange being connected to the shaft by welding.

8. A supporting structure, as set forth in claim 5, wherein said second flange being engaged with the base member.

9. A supporting structure, as set forth in claims 8, including:

a groove disposed in said projecting portion; and a retaining fastener threadably connected to said base member, disposed in said groove and retaining said projecting portion in the opening.

10. A supporting structure, as set forth in claim 9, wherein said projecting portion being cylindrical and said groove being annular and disposed in and about the cylindrical portion, said annular groove having a first tapered side, said first tapered side being engageable with the retaining fastener.

11. A supporting structure, as set forth in claim 10, where in said annular groove having a second tapered side spaced axially from the first tapered side and engageable with the retaining fastener.

12. A supporting structure, as set forth in claim 8 wherein said shaft and said projecting portions each being cylindrical and each having a bore disposed axially therethrough, said threaded fastener being disposed in said bores and connecting said shaft and said connecting portions together.

13. A supporting structure, as set forth in claim 5, wherein said second portion including:

a thrust member having first and second opposed sides; and a bore disposed in and opening at the first and second opposed sides of the thrust member, said shaft being disposed in the bore of the thrust member.

14. A supporting structure, as set forth in claim 13, wherein said thrust member being made of a non-metallic material and connected to the third flange, said thrust member being engageable with one of the first and second flanges.

15. A supporting structure, as set forth in claim 13, wherein said shaft and said thrust member each having a preselected diameter and defining a clearance therebetween.

16. A supporting structure, as set forth in claim 15, wherein said second portion including a supporting housing having spaced sides and a top, said supporting housing being connected to said operators station, said third flange being connected to the spaced sides of the supporting housing, said first flange being disposed in the supporting housing.

17. A supporting structure, as set forth in claim 13, including a spacer disposed between the third flange and the thrust member, said spacer adjusting the position of the thrust member relative to the second flange.

18. A supporting structure, as set forth in claim 4, wherein said dampening device includes a linear shock absorber and a coil spring disposed about the linear shock absorber, said linear shock absorber being positioned adjacent the stop.

19. A supporting structure for maintaining an operator's station of a work machine from excessive pivotal movement relative to a supporting frame of the work machine in response to a force being applied to and pivotally moving the operator's station, said operator's station having first and second spaced apart end portions; comprising:

a pair of spaced pivot joints having a common transverse axis, said pivot joints pivotally connecting the first end portion of the operator's station to the supporting frame, said operators station being pivotally movable about the transverse axis in elevational directions relative to the supporting frame;

a pair of spaced apart dampening devices each having first and second spaced apart extreme limits of movement and being connected to and between the second end portion of the operator's station and the supporting frame, said dampening devices maintaining the operators station from uncontrolled pivotal oscillations, a pair of spaced apart stops each having a first portion connected to a one of the supporting frame and a second portion connected to an other of the operator's station, said stops having a first flange, a second flange and a third flange, said first and second flanges being spaced apart a preselected distance "b" and being connected to the first portion, said third flange being disposed between the first and second flanges and connected to the second portion, said third flange being engageable with one of the first and second flanges in response to pivotal movement of the operator's station about said pivot axis and maintaining the operator's station from moving the pair of dampening devices to a one of the first and second extreme limits of movement, said first and second extreme limits of movement of the pair of dampening devices being spaced a preselected distance "a" apart, said distance "a" being greater in magnitude than the preselected distance "b" between the first and second flanges said first portion including a base member connected to said supporting frame, an opening disposed in said base member, a projecting portion connected to and extending from the second flange, said projecting portion being disposed in the opening and connected to said base member.

* * * * *